United States Patent
Oerlemans et al.

(10) Patent No.: US 10,012,207 B2
(45) Date of Patent: Jul. 3, 2018

(54) WIND TURBINE BLADE NOISE REDUCTION TEETH WITH STIFFENING RIB

(71) Applicant: Siemens Aktiengesellschaft, Munich (DE)

(72) Inventors: Stefan Oerlemans, Herning (DK); Anders Smaerup Olsen, Frederiksberg (DK)

(73) Assignee: Siemens Aktiengesellschaft, Munich (DE)

( * ) Notice: Subject to any disclaimer, the term of this patent is extended or adjusted under 35 U.S.C. 154(b) by 304 days.

(21) Appl. No.: 14/427,326

(22) PCT Filed: Feb. 26, 2013

(86) PCT No.: PCT/EP2013/053799
§ 371 (c)(1),
(2) Date: Mar. 11, 2015

(87) PCT Pub. No.: WO2014/044412
PCT Pub. Date: Mar. 27, 2014

(65) Prior Publication Data
US 2015/0247487 A1    Sep. 3, 2015

(30) Foreign Application Priority Data
Sep. 24, 2012 (EP) .................... 12185651

(51) Int. Cl.
*F03D 1/06* (2006.01)
*F03D 9/25* (2016.01)
*B33Y 80/00* (2015.01)

(52) U.S. Cl.
CPC ......... *F03D 1/0633* (2013.01); *F03D 1/0675* (2013.01); *F03D 9/25* (2016.05); *B33Y 80/00* (2014.12); *Y02E 10/721* (2013.01)

(58) Field of Classification Search
CPC .... F03D 7/0296; F03D 1/0641; F03D 1/0675; F03D 1/0633
See application file for complete search history.

(56) References Cited

U.S. PATENT DOCUMENTS 7,059,833 B2 * 6/2006 Stiesdal ................ F03D 1/0641
29/889.3
7,909,576 B1   3/2011 Starke
(Continued)

FOREIGN PATENT DOCUMENTS

| CN | 101392721 A | 3/2009 |
| CN | 102465827 A | 5/2012 |

(Continued)

OTHER PUBLICATIONS

EPP Corporation, Plastic Machining: Custom Plastic Components—Molding vs. Machining, Jun. 29, 2011.*
(Continued)

*Primary Examiner* — Richard Edgar
*Assistant Examiner* — John S Hunter
(74) *Attorney, Agent, or Firm* — Beusse Wolter Sanks & Maire

(57) ABSTRACT

A wind turbine blade with a noise reducing device in the form of a serrated trailing edge, whereby said serrated trailing edge comprises stiffening ribs is provided. In one embodiment, the diameter of the stiffening ribs gradually decreases towards the outer end of the trailing edge. In a further embodiment, the stiffening ribs have rounded edges. In still a further embodiment, the serrated trailing edge has teeth, whereby a tooth is provided with a stiffening rib. In another embodiment, a wind turbine including a tower is provided, wherein an electrical generator with a rotor shaft and a hub to which wind turbine blades are connected, and wherein the wind turbine comprises wind turbine blades.

13 Claims, 1 Drawing Sheet

(56) References Cited

U.S. PATENT DOCUMENTS

| | | | |
|---|---|---|---|
| 7,976,283 B2* | 7/2011 | Huck | F03D 1/0633 415/119 |
| 2008/0166241 A1 | 7/2008 | Dobrzynski | |
| 2009/0074585 A1 | 3/2009 | Koegler et al. | |
| 2011/0142635 A1 | 6/2011 | Fritz | |
| 2011/0142665 A1 | 6/2011 | Huck | |
| 2012/0027590 A1 | 2/2012 | Bonnet | |
| 2012/0195764 A1* | 8/2012 | Fuglsang | F03D 1/0641 416/223 R |

FOREIGN PATENT DOCUMENTS

| | | |
|---|---|---|
| DE | 10340978 A1 | 4/2005 |
| DE | 10340978 B4 | 9/2008 |
| EP | 0652367 A1 | 5/1995 |
| EP | 1314885 A1 | 5/2003 |
| EP | 1314885 B1 | 8/2007 |
| EP | 2479423 A1 | 7/2012 |
| EP | 2514962 A1 | 10/2012 |
| EP | 2647835 A1 | 10/2013 |
| WO | 2012071679 A1 | 6/2012 |

OTHER PUBLICATIONS

Schepers et al.: "SIROCCO: Silent Rotors by Acoustic Optimization" presented at the 2nd International Meeting on Wind Turbine Noise, Lyons, France, Sep. 2007, ECN Technical Paper.

Thomas F. Brooks et al.: "Airfoil Self-Noise and Prediction", NASA Reference Publ. 1218, Jul. 1989; 1989.

CN Office Action dated Dec. 5, 2016, for CN patent application No. 201380049837.9.

EP Opposition dated Mar. 15, 2017, in connection with EP patent application No. 13707346.6.

Rosato et al, "Injection Molding Handbook, Third edition", Kluwer Academic Publishers, 2000.

Maier, Clive, "Design guides for Plastics", Tangram Technology (Enablers Econology in Plastics), Apr. 2009.

Schepers et al, "SIROCCO: Silent Rotors by Acoustic Optimization" presented at the 2nd International Meeting on Wind Turbine Noise, Lyons, France, Sep. 2007, ECN Technical Paper (previously submitted).

* cited by examiner

WIND TURBINE BLADE NOISE REDUCTION TEETH WITH STIFFENING RIB

CROSS REFERENCE TO RELATED APPLICATIONS

This application is the US National Stage of International Application No. PCT/EP2013/053799 filed Feb. 26, 2013, and claims the benefit thereof. The International Application claims the benefit of European Application No. EP12185651 filed Sep. 24, 2012. All of the applications are incorporated by reference herein in their entirety.

FIELD OF INVENTION

The present invention relates to a wind turbine blade with a noise reducing device in the form of a serrated trailing edge.

BACKGROUND OF INVENTION

Wind turbine blades generate aerodynamic noise when the wind turbine operates and the rotor is in rotational movement. In general aerodynamic noise source mechanism for lifting air-foils can be classified as follows: a) turbulent boundary-layer flow shed off of the trailing edge, b) separated boundary-layer and stalled airfoil flow, c) vortex shedding due to laminar boundary-layer instabilities, and d) vortex shedding from blunt trailing edges.

It was found out that the main force of aerodynamic noise originates at the trailing edge of the outer span of wind turbine blades. A surprising finding was that noise from the blade tip is of minor importance. It was also found that noise produced by the blades is proportional to the wind speed (i.e. rotational speed) at the blades.

Noise sets a limitation on how close a wind turbine can be built to residential areas and at what rotational frequency a rotor of a wind turbine can rotate.

It is well known to optimise wind turbine blades in the design phase to reduce aerodynamic noise. The attachment of noise reducing devices to the trailing edge of wind turbine blades as a retrofit or after production is well known in the wind turbine industry. One example for a noise reducing device is a serrated plastic plate as a part of a retrofit package attached to the trailing edge of wind turbine blades.

The attachment or production of wind turbine blades with winglets is another means to reduce noise from the wind turbine blade.

EP 1314885 A1 discloses a flexible serrated trailing edge for wind turbine rotor blades. In order to improve the efficiency of an existing wind turbine rotor it is proposed to attach a serrated panel to at least a part of the trailing edge of the wind turbine blades. By using serrated trailing edges the lift and drag characteristics of a lifting surface can be improved.

EP 0652367 A1 proposes a wind turbine having a trailing edge with a saw-tooth form. In order to obtain this form a saw-tooth-shaped strip can be used which is fixed to the trailing edge of the rotor blade.

U.S. 2008/0166241 A1 discloses a wind turbine blade brush with bristles or a brush disposed on an outer surface of the wind turbine blade. The function of the bristles is to achieve a noise reduction effect. The bristles can be arranged in at least one row along a longitudinal direction of the blade or in the vicinity of a trailing edge.

DE 10340978 B1 similarly discloses a wind turbine blade with a brush attached to the trailing edge wherein single fibers of the brush branch out. The branches of the brush imitate feathers of an owl.

SUMMARY OF INVENTION

It is an object of the present invention to provide a wind turbine blade with an efficient noise reducing device.

According to aspects of the present invention this object is achieved in the above defined wind turbine blade in that said serrated trailing edge comprises stiffening ribs.

Stiffening ribs are disposed on said serrated trailing edge such that a lateral protrusion of the serrated trailing edge is furnished with a stiffening rib. The serrated trailing edge is basically a base plate which fits one side of the blade. The stiffening ribs extend vertically from the surface of the serrated trailing edge.

In the inventive turbine blade it is preferred that the diameter of the stiffening ribs gradually decreases towards the outer end of the trailing edge. This shape is adapted to the acting forces and maintains a certain stiffness of the serrated trailing edge which prevents unwanted vibrations.

According to a further development of the inventive wind turbine blade the stiffening ribs have rounded edges. Rounded edges have shown to yield good results regarding acoustic and aerodynamic performance.

It is particularly preferred that the serrated trailing edge comprises multiple teeth, whereby each tooth is provided with a stiffening rib. By using said teeth the flexibility and stiffness of the serrated trailing edge can be varied in a controlled way. An additional factor for optimisation lies in the material properties of the stiffening ribs. Accordingly a particular stiffness can be achieved by shaping and choosing a certain material composition.

In the inventive turbine blade embodiments said stiffening ribs are preferably aligned in parallel. Accordingly several or all stiffening ribs can be aligned sideways.

According to embodiments of the invention the stiffening ribs can be arranged in the region ranging approximately from 70% to 100% of the span. Preferably the stiffening ribs are arranged between 75% and 95% of the span. To attach the stiffening ribs in this region has shown the best results regarding reduction of aerodynamic noises.

In order to simplify the production of the stiffening ribs it may be envisaged that they are printed by a 3D printer. This production technology allows to give the stiffening ribs varying stiffness within the structure. However, as an alternative the stiffening ribs can be made of casted plastic or cut out and machined from a plate.

Aspects of the invention further relate to a wind turbine, including a tower, an electrical generator with a rotor shaft and a hub to which wind turbine blades are connected.

Embodiments of the inventive wind turbine include the inventive wind turbine blades.

BRIEF DESCRIPTION OF THE DRAWINGS

Embodiments of the invention and its underlying principle will be better understood when consideration is given to the following detailed description of preferred embodiments.

In the accompanying drawings.

DETAILED DESCRIPTION OF INVENTION

Figure 1:
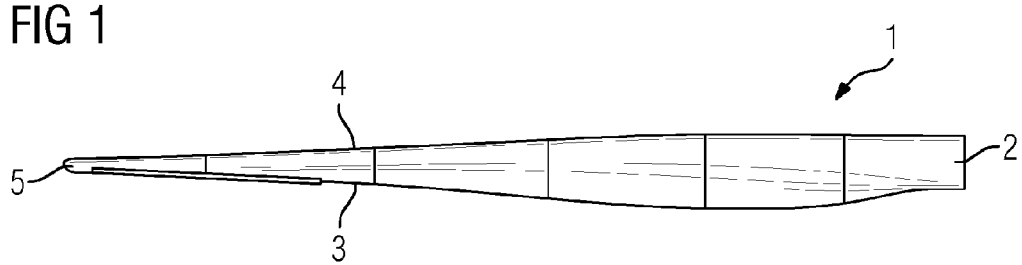
FIG. 1 is a top view of an inventive wind turbine blade.

FIG. 1 is a top view of a wind turbine blade 1 with a blade root 2 for connecting the blade 1 to a hub of a rotor which is part of an electrical generator. Further the wind turbine blade 1 includes a trailing edge 3, a leading edge 4 and a blade tip 5.

The wind turbine blade 1 comprises a noise reducing device in the form of a serrated trailing edge 3 comprising stiffening ribs 7.

Figure 2:
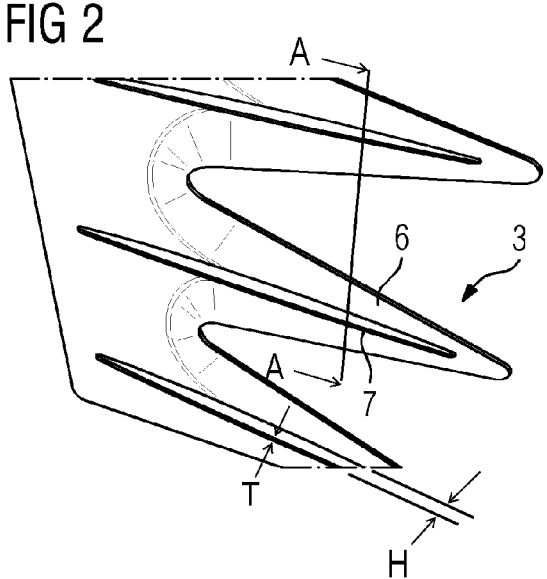
FIG. 2 is a perspective view of a serrated trailing edge.

FIG. 2 is a perspective view of the serrated trailing edge 3. As can be seen in FIG. 2 the serrated trailing edge 3 comprises "teeth" 6, which extend from the wind turbine blade 1 sideways, whereby each tooth is provided with a stiffening rib 7. In FIG. 2 it can be seen that a stiffening rib 7 has a decreasing diameter/height H towards its outer end. Several or all stiffening ribs 7 are arranged in parallel and their size and diameter/height H can be modified in order to influence the noise reduction effect. Similarly the size and distance between adjacent teeth 6 can be chosen in order to obtain a specific aerodynamic and noise reducing effect.

The ribs 7 strengthen and stiffen the serrations of the trailing edge 3 and thus counteract vibrations or a deformation of the serrations. In conventional wind turbine blades vibrations can lead to flutter and additional noise. Bending of serrations can alter the airfoil shape and lead to adverse aerodynamic performance and additional noise. Accordingly these unwanted effects can be avoided by using said stiffening ribs 7, whereby each tooth 6 of the serrated trailing edge 3 is furnished with a stiffening rib 7. The use of rounded edges further reduces the emission of noise.

When the stiffening ribs 7 are used the base material for the teeth 6 may be more flexible than would be the case without the rib. The stiffening ribs 7 can be dimensioned in different ways so as to achieve the desired stiffness of the teeth 6. The rib 7 can furthermore be shaped in a way providing advantageous aerodynamic performance.

Figure 3:
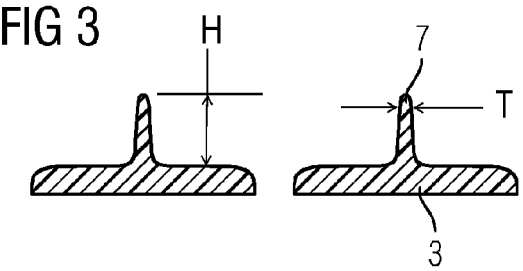
FIG. 3 is a cross-sectional view of the serrated trailing edge of FIG. 2.

FIG. 3 is a cross-sectional view along line A-A of the trailing edge 3 of FIG. 2 which is provided with a stiffening rib 7. In the cross-sectional view one can see that the stiffening ribs 7 have rounded edges and that the trailing edge 3 has a thickness T which gradually decreases along the height H at both sides.

In this embodiment the stiffening ribs 7 are printed with a 3D printer. Using this production technology several ribs 7 with slightly different shapes, dimensions and varying stiffness can be produced, if necessary. Stiffening ribs 7 are made from a plastic material.

The use of the stiffening ribs 7 at the serrated trailing edge 3 as noise reducing device significantly improves the emission of noise during rotation of the wind turbine blade. Further the rotational frequency of a rotor and/or the rotor diameter can be increased in order to enable a more efficient operation of a wind turbine. Another positive effect of the reduction of noise is that wind turbines can be built closer to residential areas.

Although aspects of the present invention have been described in detail with reference to preferred embodiments, the present invention is not limited by the disclosed examples from which the skilled person is able to derive other variations without departing from the scope of the invention.

The invention claimed is:

1. A wind turbine blade comprising
a noise reducing device in a form of a base plate comprising an unserrated forward portion and serrated trailing edge comprising plural teeth each comprising a stiffening rib,
wherein a height of the stiffening ribs decreases towards an outer end of the serrated trailing edge, and
wherein the stiffening ribs extend forward past the serrated trailing edge into the unserrated forward portion of the base plate.

2. A wind turbine blade according to claim 1,
wherein the stiffening ribs have rounded edges.

3. A wind turbine blade according to claim 1,
wherein said stiffening ribs are aligned in parallel.

4. A wind turbine blade according to claim 1,
wherein the stiffening ribs are arranged in a region ranging from 70% to 100% of a span of the wind turbine blade.

5. A wind turbine blade according to claim 1,
wherein the stiffening ribs are printed by a 3D printer.

6. A wind turbine blade according to claim 1,
wherein the stiffening ribs are made of casted plastic or cut out and machined from a plate.

7. A wind turbine, comprising:
wind turbine blades according to claim 1, a tower, an electrical generator with a rotor shaft, and a hub to which the wind turbine blades are connected.

8. A wind turbine blade according to claim 1,
wherein the stiffening ribs are arranged in a region ranging from 75% to 95% of a span of the wind turbine blade.

9. A wind turbine blade according to claim 1, wherein for each rib a thickness of the rib in a middle of the rib is greater than a thickness at ends of the rib.

10. A wind turbine blade according to claim 1, wherein for each tooth an end of a respective rib closest to a tip of the tooth is set back from the tip.

11. A wind turbine blade comprising:
a noise reducing device in a form of a base plate comprising an unserrated forward portion and serrated trailing edge comprising plural teeth each comprising a stiffening rib,
wherein a height of the stiffening ribs decreases towards an outer end of the serrated trailing edge, and
wherein, for each rib, a thickness at ends of the rib is less than a thickness between the ends.

12. A wind turbine blade according to claim 11, wherein each rib stops short of a tip of a respective tooth of the plural teeth.

13. A wind turbine blade comprising:
a noise reducing device in a form of a base plate comprising an unserrated forward portion and serrated trailing edge comprising plural teeth each comprising a stiffening rib,
wherein a height of the stiffening ribs decreases towards an outer end of the serrated trailing edge, and
wherein each rib stops short of a tip of a respective tooth of the plural teeth.

* * * * *